(12) United States Patent
Cortland et al.

(10) Patent No.: US 10,661,293 B2
(45) Date of Patent: May 26, 2020

(54) CONTROL DEVICE FOR ENABLING RF CONTROL IN A USER ENVIRONMENT

(71) Applicant: The Cauldron London Ltd, London (GB)

(72) Inventors: Matthew Cortland, London (GB); David Duckworth, Stafford (GB)

(73) Assignee: The Cauldron London Ltd., London (GB)

( * ) Notice: Subject to any disclaimer, the term of this patent is extended or adjusted under 35 U.S.C. 154(b) by 0 days.

(21) Appl. No.: 16/193,898

(22) Filed: Nov. 16, 2018

(65) Prior Publication Data

US 2019/0151879 A1    May 23, 2019

(30) Foreign Application Priority Data

Nov. 17, 2017 (GB) .................................. 1719106.5

(51) Int. Cl.
*B05B 12/00* (2018.01)
*H04B 5/00* (2006.01)
*B05B 12/08* (2006.01)

(52) U.S. Cl.
CPC ............ *B05B 12/004* (2013.01); *B05B 12/08* (2013.01); *H04B 5/0037* (2013.01); *H04B 5/0062* (2013.01)

(58) Field of Classification Search
CPC ..... B05B 12/004; B05B 12/08; H04B 5/0037; H04B 5/0062
See application file for complete search history.

(56) References Cited

U.S. PATENT DOCUMENTS

| | | | |
|---|---|---|---|
| 2001/0034257 A1* | 10/2001 | Weston | A63F 13/86 463/1 |
| 2006/0154726 A1* | 7/2006 | Weston | A63H 30/04 463/37 |
| 2010/0125362 A1* | 5/2010 | Canora | G06Q 20/3278 700/236 |
| 2011/0081970 A1 | 4/2011 | Barney et al. | |
| 2015/0290545 A1* | 10/2015 | Barney | A63H 3/46 463/32 |
| 2018/0217677 A1* | 8/2018 | Penning De Vries | G08C 17/00 |

FOREIGN PATENT DOCUMENTS

| | | |
|---|---|---|
| CN | 105427466 A | 3/2016 |
| KR | 101511293 B1 | 4/2015 |
| WO | WO 2016/050708 A1 | 4/2016 |

* cited by examiner

*Primary Examiner* — Omer S Khan
(74) *Attorney, Agent, or Firm* — Flaster Greenberg PC

(57) ABSTRACT

A master control device in the configuration of a wand may control pre-programmed aspects of the user's environment using RFID/NFC tags and RFID/NFC readers to initiate pre-programmed behavior in a computer database. This pre-programmed behavior be the control of items that rely on electricity and/or gas, such as lights, electric fireplaces, electric valves, activating the listening feature on a home assistant, accruing a balance, paying for items with a topped-up balance, and locking and unlocking doors. This master control device can be used in the connected home or business, such as a pub, restaurant, hotel, or immersive experience.

24 Claims, 14 Drawing Sheets

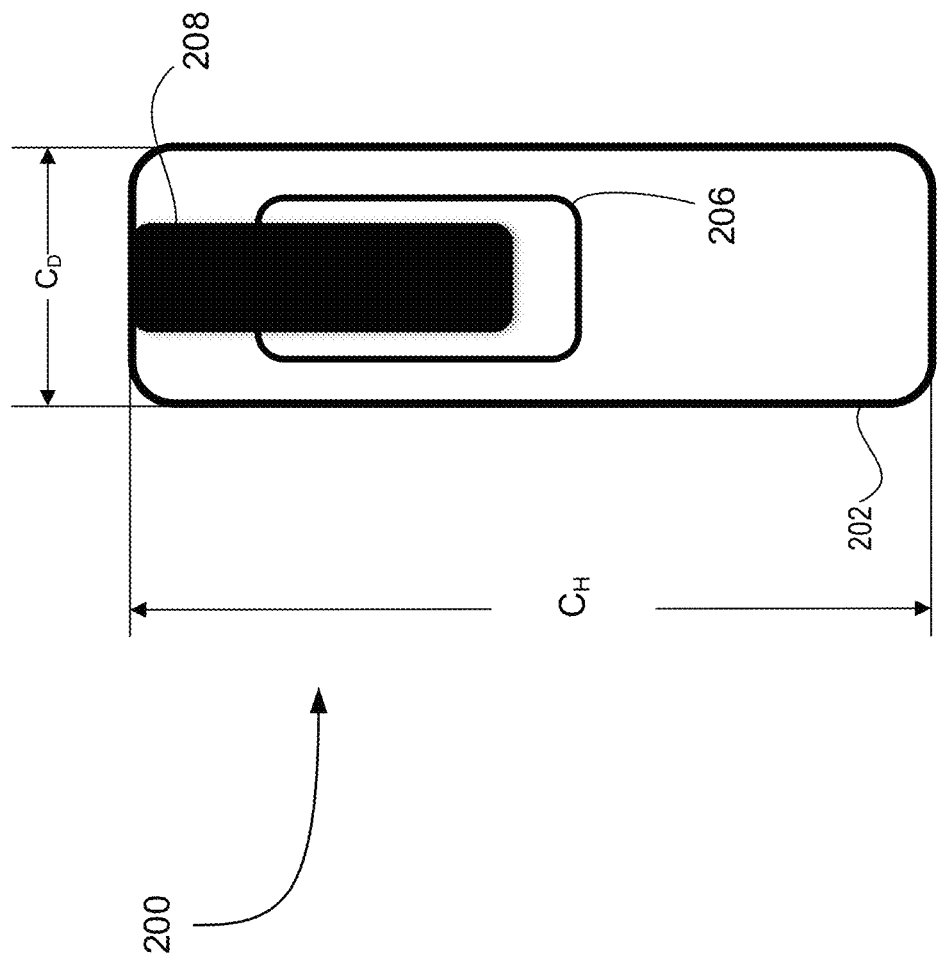

CONTROL DEVICE FOR ENABLING RF CONTROL IN A USER ENVIRONMENT

CROSS-REFERENCE TO RELATED APPLICATIONS

This application claims the benefit of United Kingdom Provisional Application No. 1719106.5, filed Nov. 17, 2017, the contents of which are incorporated by reference herein.

BACKGROUND

In recent years there has been a wave of innovation in Internet of Things (IoT) technology for consumer use. The growing popularity of home assistants, such as Alexa and Google Home, as well as home automation systems like Nest mean that this technology is reaching a mainstream audience. Now more than ever, a person can control aspects of the home using a smartphone, voice command, or gesture.

Radio frequency identification (RFID) and near-field communication (NFC) technology has been implemented in various products and systems. RFID and NFC uses range from tracking of good and items to processing payments. RFID and NFC technology, however, can be utilized to improve various elements of IoT technology to control aspects of a user's environment.

SUMMARY

Systems, methods, and apparatus are described herein for controlling a user's environment using short-range communication signals and the Internet of Things (IoT). A universal receiver (UR) is disclosed herein that may control aspects of a user's environment based on short-range communication signals received from a master control device (e.g., a user control device). For example, the universal receiver may be a universal wand receiver (UWR) that communicates with the master control device as disclosed herein. The UWR may include a short-range communication circuit, such as a radio frequency (RF) circuit or a near-field communication (NFC) circuit, configured to transmit and/or receive short-range communication signals, such as RF signals or NFC signals. The short-range communication signals may include a unique identifier, such as an RFID or other serial number. The unique identifier may be associated with the master control device.

The short-range communication signals may be received by the UWR and used to detect the presence of a high frequency, passive transponder (e.g., an RFID tag). The transponder may be located within the master control device, for example as part of a control circuit. The control circuit may include an LED and/or a means to power the transponder and/or the LED. The transponder may be incased in a casing (e.g., made of glass, plastic, resin, and/or the like), which may limit the interference of a short-range communication signal, and embedded in the tip of the master control device. The UWR may transmit and/or receive data via a compatible microchip reader of the same frequency and protocol as the signals being transmitted from the master control device. For example, the master control device may transmit the signals by RFID, NFC, Bluetooth, WiFi, and/or the like.

The UWR may be a computing device that has stored thereon, or has access to, a database or other dataset of pre-programmed actions that may be performed in response to the short-range communication signals received from the master control device. Once the RFID/NFC reader of the UWR has successfully read the data from the master control device, the computer database to which the reader is attached may perform a pre-programmed action that performs some further action. For example, the reader may be attached to a door lock, and the computer database may send a signal to the lock to unlock.

In one example, the master control device may include an elongated magic wand. The elongated magic wand may be made of plastic, glass, metal, wood, silicon, hardened resin, PLA, PLA Composite, and/or the like. The elongated magic wand may include the RFID tag in glass tubing embedded in the tip of the master control device. The elongated magic wand may include memory for storing the unique identifier and/or other data. The elongated magic wand may include a processor configured to send the identifier and/or other data via the short-range communication signals sent via the transponder. The elongated magic wand may include one or more batteries, a PCB (e.g., a touch-capacitive PCB), one or more LEDs, and/or one or more types of resins or PLAs.

The master control device may be manufactured to contain the control circuit. The control circuit (e.g., within a tubing) may be placed into a mold. The mold may be filled with a liquid substance (e.g., plastic or resin) that may surround the control circuit. Alternatively, the master control device may be manufactured using 3D printing techniques. The 3D-printed master control device may have an empty space where the control circuit can be inserted after printing.

The master control device may be used to dispense a drink. For example, the master control device may be assigned to a given user. The reader may be attached to a drink dispenser (e.g., a beer tap). The user may place the wand near the reader in order to dispense the drink. The UWR may record the amount of liquid that has been dispensed and pass that information to a database, where a monetary value is assigned to that volume of liquid. Upon check-out, the user may be charged according to the amount of drink that is dispensed.

BRIEF DESCRIPTION OF THE DRAWINGS

FIG. 2A is a diagram that illustrates an example communication circuit 200 that may be used as part of a master control device.

DETAILED DESCRIPTION

Figure 1:
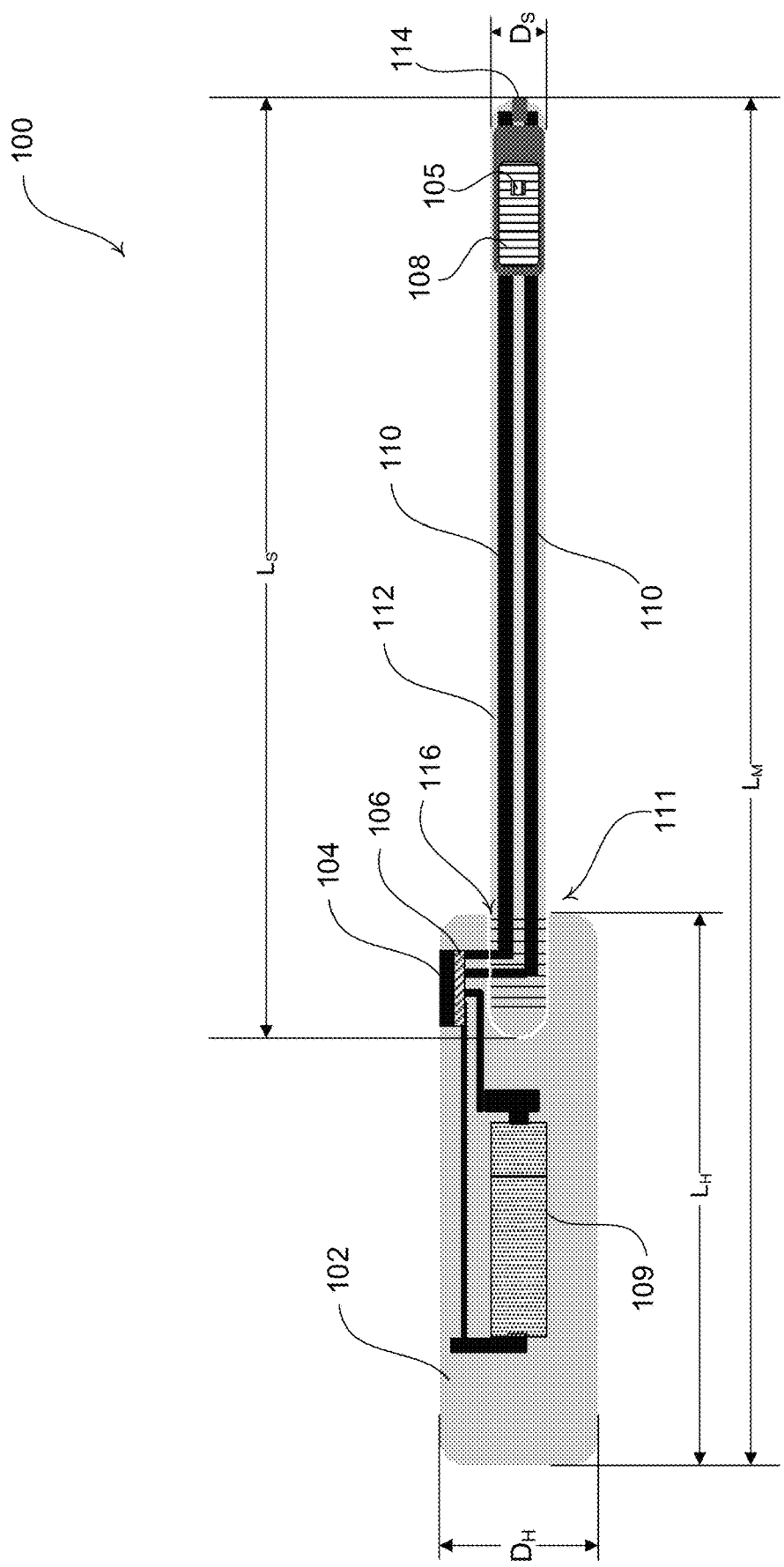
FIG. 1 illustrates an example master control device with capacitive touch control.

FIG. 1 illustrates an example master control device 100 with capacitive touch control. Master control device 100 may be in the shape of a wand, for example. The master control device 100 may have a handle 102 and a shaft 112. The master control device 100 may include a communication circuit 108. The communication circuit 108 may operate using radio frequency (RF) communications. For example, the control circuit 100 may communicate a radio frequency identification (RFID), Bluetooth (e.g., Bluetooth low energy (BLE)), and/or Near Field Communication (NFC) signals for enabling control of devices in a user environment.

The communication circuit 108 may include an LED 105. The LED 105 may turn on/off/blink to provide indications to the user. For example, the LED 105 may blink when the master control device 100 is turned on or off, the master control device 100 communicates with another device (e.g., a universal receiver), and/or another action is performed by the master control device 100.

The handle 102 may include an input area 104. The input area 104 may be a button that may be actuated by a user. The input area 104 may be may be a capacitive touch area that senses user input upon a user touch. The user may touch the input area 104 to interact with a control circuit 106 in the master control device 100. The control circuit 106 may be in direct communication with the input area (e.g., a capacitive touch control circuit) to receive input from the user. The control circuit 106 may send one or more signals via filaments and/or wires 110 to a resistor/LED 114. The resistor/LED 114 may be located at the distal end of the shaft 112. The resistor/LED 114 may be different from the LED 105. When the user touches the input area 104, the resistor/LED 114 may be illuminated. For example, the resistor/LED 114 may turn on, increase in lighting level over a period of time to a maximum lighting level, or blink. When the user touches the input area 104 again, or releases the touch from the input area, the resistor/LED 114 may be turned off, decrease in lighting level over a period of time to a minimum lighting level (e.g., off), or stop blinking. The filaments and/or wires 110 may be made of any suitable material. For example, filaments and/or wires 110 may be made of a graphite-PLA composite (e.g., if they are filaments), or copper (e.g., if they are wires).

The resistor/LED 114 and/or the control circuit 106 may be powered by a battery 109. For example, the battery 109 may be a AAA battery. The battery 109 may be replaceable via an opening 111 in the handle 102 where the handle 102 and shaft 112 are connected to each other. The battery 109 may power other elements of the master control device 100 via the filaments and/or wires 110. The battery 109 may be a rechargeable battery and may be charged via induction (e.g., Qi charging). The battery 109 may be connected to a charging coil (not shown) that may be contained within the handle 102.

The handle 102 and the shaft 112 may be detachable from each other. For example, the handle 102 and the shaft 112 may be attached to each other by threads 116.

The master control device 100 may have a length LM that is within the range of 250 mm to 350 mm. For example, the length LM of the master control device 100 may be 270 mm to 330 mm. The length LM of the master control device 100 may be 290 mm to 310 mm.

The handle 102 may have a length LH within the range 120 mm to 200 mm. For example, the length LH of the handle 102 may be 140 mm to 180 mm. The length LH of the handle 102 may be may be 150 mm to 170 mm. The handle 102 may have a diameter DH within the range of 20 mm to 100 mm. The handle 102 may have a diameter DH within the range 40 mm to 80 mm. The handle 102 may have a diameter DH within the range of 50 mm to 70 mm.

The shaft 112 may have a length Ls within the range 150 mm to 200 mm. For example, the length Ls of the shaft 112 may be 160 mm to 190 mm. The length Ls of the shaft 112 may be 170 mm to 180 mm. The shaft 112 may have a diameter Ds within the range 8 mm to 15 mm. For example, the shaft 112 may have a diameter Ds of 9 mm to 14 mm. The diameter Ds of the shaft 112 may be 10 mm to 13 mm.

FIG. 2A is a diagram that illustrates an example communication circuit 200 that may be used as part of a master control device (e.g., the communication circuit 108 of the master control device 100 shown in FIG. 1) for controlling one or more devices in a user environment. The communication circuit 200 may operate using RF communications. For example, the communication circuit 200 may communicate via RFID, BLE signals, and/or NFC signals for enabling control of devices in a user environment.

The communication circuit 200 may include an embedded transponder 208. The transponder 208 may be a passive RFID tag. The passive RFID tag may enable the communication of the RFID when the RFID tag is within an RF range of an RFID reader and receives power from the RFID reader. Power may be supplied to the transponder 208 by a microchip reader (e.g., an RFID/NFC reader), which may be connected to a computer database. The communication circuit 200 may also, or alternatively, use an active RFID tag that may be battery powered to transmit an RFID by an internal battery power source (e.g., RFID beacon). Though a transponder 208 or RFID communications may be described, the transponder 108 may be an NFC transmitter or another transceiver or RF communication circuit capable of performing short-range wireless communications.

The communication circuit 200 may be housed in a tube (e.g., casing 202) and may contain one or more coiled antennas (e.g., coil 206) that form a magnetic field upon the receipt of RF signals, as shown in FIG. 2A. The coiled antenna 206 may provide power to the transponder 208 in the RFID tag via the RF signals. The casing 202 may enclose the communication circuit transponder 208 and/or the coiled antenna 206. The casing 202 may be configured such that it fits within an opening of the master control device.

The casing 202 may have a height CH within the range 12 mm to 23 mm. For example, the height CH of the casing 202 may be 14 mm to 21 mm. The height CH of the casing 202 may be 16 mm to 19 mm. The casing 202 may have a diameter CD within the range 2.12 mm to 3.85 mm. For example, the diameter CD of the casing 202 may be 2.42 mm to 3.55 mm. The diameter CD of the casing 202 may be 2.72 mm to 3.25 mm.

Figure 2B:
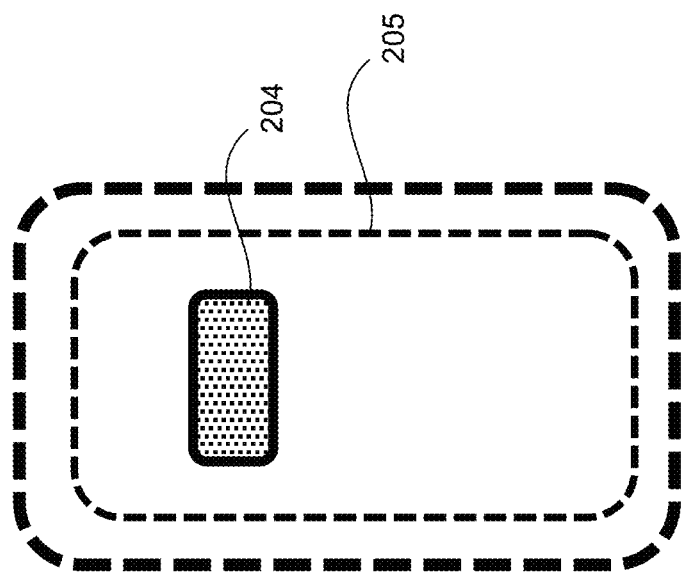
FIG. 2B is a diagram that illustrates an example of a printed circuit board (PCB).

FIG. 2B is a diagram that illustrates an example of a printed circuit board (PCB) 210. The PCB 210 includes an RF controlled LED 204. There may be, for example, two RF controlled LEDs 204 (e.g., on opposite sides of the transponder 208). The RF controlled LED may be a passive NFC LED, but other RF controlled LEDs may also be implemented. The PCB 210 may include a coiled antenna (e.g., coil 205) that may be used to power the LED 204 when the coiled antenna comes within an RF range of an RF circuit, such as an NFC circuit or other RF circuit. The coil 205 may communicate via the same or different RF communications as the coil 206 illustrated in FIG. 2A.

Referring again to FIG. 2B, the LED 204 may provide feedback to the user. For example, the LED 204 may turn on or blink when, for example, the coil 205 is within an RF range of a universal receiver and/or performs communication with the universal receiver (e.g., after communication is sent, while communication is sending, and/or after receiving an acknowledgment message). The LED 204 may turn off or stop blinking when the coil 205 is outside of the RF range of the universal receiver and/or completes communication. The LED 204 may be a single color, or the LED 204 may use different colors to provide different forms of feedback.

Figure 2C:
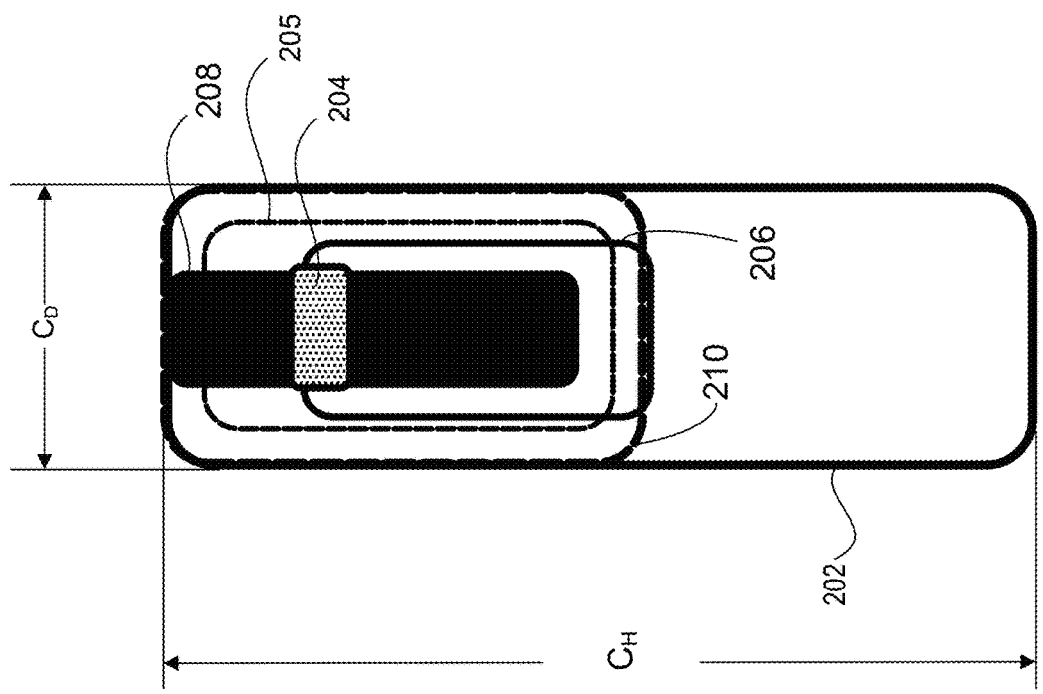
FIG. 2C illustrates an example control circuit that may be used as part of a master control device.

As shown in FIG. 2C, the PCB 210 may be included in the casing 202 with the transponder 208. The PCB may be a flexible PCB (FPCB) and may conform to an inner surface of the casing 202. The PCB 210 and/or the transponder 208 in the casing may be referred to as a control circuit 220 that may be used to perform control by communicating RF signals from a master control device. The casing 202 of the control circuit 220 may be transparent such that the LED 204 is visible through the casing 202 when active. The casing 202 may be made of any suitable material, including but not limited to glass, plastic, resin, metal, and/or the like. The coils 205, 206 may be made of any suitable material. The transponder 108 may have an associated unique identifier, and may transmit the unique identifier to a receiver (e.g., a Universal Wand Receiver (UWR)) upon the coil 206 being powered by the RF signals from the receiver. Though multiple coils 205, 206 are provided, the LED 204 may be in communication with the same coil that is used by the transponder 208.

Figure 2D:
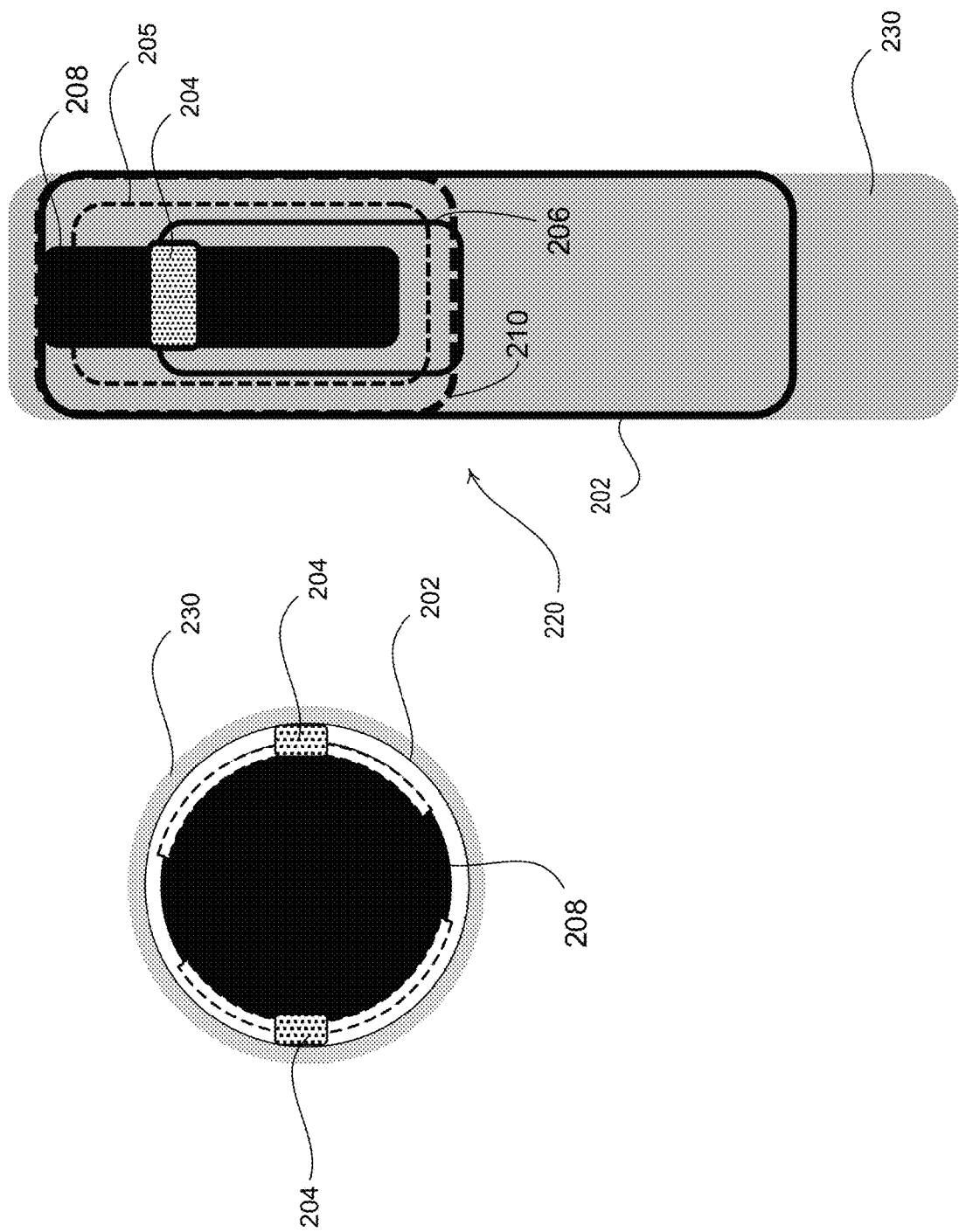
FIG. 2D illustrates side-on and top-down views of an example control circuit residing in the tip of a master control device.

FIG. 2D illustrates side-on and top-down views of the control circuit 220 residing in the tip of a master control device 230. The control circuit 220, encased in casing 202 and including coils 205, 206, LEDs 204, and/or transponder 208, may be inserted into a shaft 230 of a master control device. For example, the master control device may be in the shape of a wand, and shaft 230 may be located at the distal end of the wand. The shaft 230 may include a hollow portion, into which the control circuit 220 may be inserted. The control circuit 220 may be inserted into the hollow portion during manufacturing (e.g., the master control device may be manufactured around the control circuit 220), or after manufacturing. The shaft 230 may include a solid portion that may be located proximal to the hollow portion. The solid portion may act as a base for the control circuit 220 to sit upon. The portion of the shaft 230 surrounding the control circuit 220 may have a thickness within a range of 0.8 mm to 3 mm.

Figure 3:
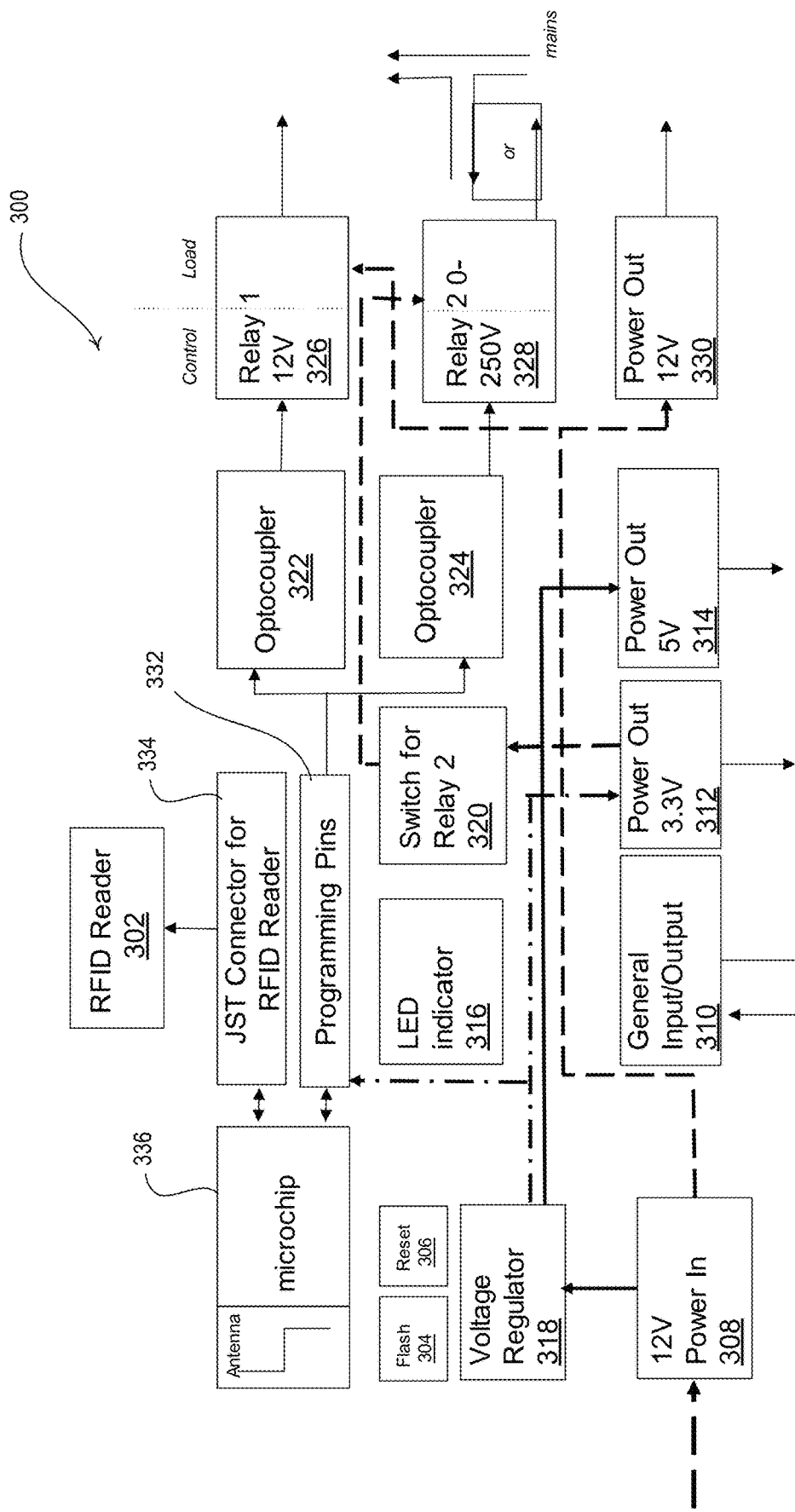
FIG. 3 shows an example block diagram of a universal controller (UC) with which the master control device may be in communication.

FIG. 3 shows an example block diagram of a universal controller (UC) 300 (e.g., a UWC) with which the master control device may be in communication. The UC 300 may be part of a universal receiver (UR). The UR may be, for example, a universal wand receiver (UWR). The UC 300 may be and/or may include a printed circuit board (PCB). The UC 300 may include or be connected to a reader 302 for a given wireless communication protocol (e.g., RFID, NFC, and/or the like). The reader 302 may receive the unique identifier sent by the master control device, and may activate and/or deactivate one or more relays and/or pins.

Power may be provided to the UC 300 via a power input 308. The power input 308 may include 12V of power. For example, the power may be provided by a power source from an electric connection to a wall outlet or a 12V power bank. The power may be directed to a load via a first relay 326 (e.g., Relay 1), a switch 320 for a second relay 328 (e.g., Relay 2), a voltage regulator 318, and/or a 12V power out pin 330.

The first relay 326 may be used to power a load (e.g., on/off) in response to RF communications received from the master control device. The first relay 326 may use 12V. The first relay 326 may be rated for up to 250V. For example, the first relay 326 may provide a dedicated power source to a lock, a valve, or light source (e.g., LED) and provide power to lock/unlock the lock, turn on/off a valve, or turn on/off a light.

The switch 320 for the second relay 328 may allow for the load for the second relay 328 to be a switched electrical load to be powered on/off. The load powered via the second relay 328 may use between 0 and 250V, and the second relay 328 may be rated for up to 250V. The switch 320 for the second relay 328 may be used to turn on or off the electrical load receiving power from the second relay 328, such as a lamp powered from a different power source, in response to RF communications received from the master control device.

The power may pass through a voltage regulator 318. The voltage regulator 318 may drop the voltage (e.g., from 12V to, for example, 5V and/or 3.3V) for other types of electrical loads. The regulated voltage (e.g., 3.3V) may be provided to the microchip 336 and/or an RFID reader 302. The voltage also may be provided from the voltage regulator 318 to a power out 312 and/or a power out 314. The power out 314 may be a 5V power source and may be used to power one or more external devices (e.g., an LED, an LED strip, a neopixel LED ring, etc. comprising one or more colored LEDs) via the power out pin. The power out 312 may provide 3.3V of power. The power out 312 may be provided to a flow meter that measures the movement of a fluid provided through the flow meter from a source.

The general input-output 310 may be comprised of pins that may connect to a control source for adjusting input/output control for the amount of liquid provided through the flow meter. The control source may be a knob or meter that changes the amount of time that the flow meter is powered on to adjust the amount of time liquid may be poured through the flow meter on the power out 312.

The microchip 336 may include a processor for communicating signals within the UC 300 for performing control, and/or communicating signals with external devices. The processor on the microchip 336 may include one or more circuits, such as general purpose processors, special purpose processors, conventional processors, digital signal processors (DSPs), microprocessors, integrated circuits, a programmable logic device (PLD), application specific integrated circuits (ASICs), and/or the like. The processor may perform signal coding, data processing, power control, input/output processing, and/or any other functionality that enables the UC 300 to perform as described herein.

The microchip 336 may include memory for storing information on the UC 300. The processor on the microchip 336 may be in electrical communication with the memory. The processor may store information in and/or retrieve information from the memory. The UC 300 may store information on a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The processor may access the memory for executable instructions and/or other information that may be used by the UC 300.

The microchip 336 may allow for communication with external devices. The processor on the microchip may be in electrical communication with a communication circuit for sending and/or receiving information. The communication circuit may be capable of performing wired and/or wireless communications. For example, the communication circuit may include a radio frequency (RF) transceiver for transmitting and receiving RF signals (e.g., BLUETOOTH®, near field communication (NFC), WIFI®, WI-MAX®, cellular, etc.) via an antenna, or other communications module capable of performing wireless communications. The memory may be connected to the antenna to send and receive data (e.g., a firmware update).

The microchip 336 may allow the UC 300 to communicate with an external database via the antenna. Information may be received from the master control device, such as a unique identifier (e.g., RFID), and the information may be compared with information received from the database. The RFID may be associated in the database with a given user or user account. The microchip 336 may identify information from the power provided to various devices and store the information in the external database. For example, the microchip 336 may identify that a certain amount of liquid has been poured out of the flow meter and store that information with the unique identifier (e.g., RFID) that is received.

The microchip 336 may control the relays through the optocouplers 322, 324. The optocouplers 322, 324 may isolate a control side of a respective relay (e.g., relay 326 or relay 328) from a load side of the relay. The control side of the relay may be a switch used to turn on or off the flow of electricity through the load side of the relay.

The UC 300 may include an RFID reader 302. Though an RFID reader 302 is illustrated, another RF communication device may be used. The RFID reader 302 may be attached to the UC 300 by use of a connector 334. The connector 334 may be, for example, a JST Connector. The connector 334 may be attached to programming pins 332 that communicate with the RFID reader 302 for receiving the RFID or other RF communications from the reader. The programming pins 332 may communicate the information to the microchip 336 for processing. The connector 334 may include clips that engage the programming pins to create connection the connection with the RFID reader 302. The RFID reader 302 may be replaceable. To replace the RFID reader, the connector 334 may be disconnected and another RFID reader 302 may be attached to the programming pins.

The RFID reader 302 may read a unique identifier from a master control device (not shown) and may communicate the unique identifier to the processor on the microchip 336. The UC 300 may include an LED indicator 316, which may blink or glow to indicate a status of the UC 300. For example, the LED indicator 316 may continuously glow green to indicate that the UC 300 is powered and turned on. The LED indicator 316 may blink green to indicate that the UC 300 is receiving and/or installing a firmware update. The programming pins 332 may be used to program the UC 300 (e.g., by a bootloader). The programming pins 332 may allow one or more external devices to connect to the UC 300. The UC 300 may include one or more buttons, such as the flash button 304 and/or the reset button 306. The buttons 304, 306 may be used to perform a function on the UC 300. For example, one or more buttons may be pressed to program and/or reset the UC 300.

Figure 4:
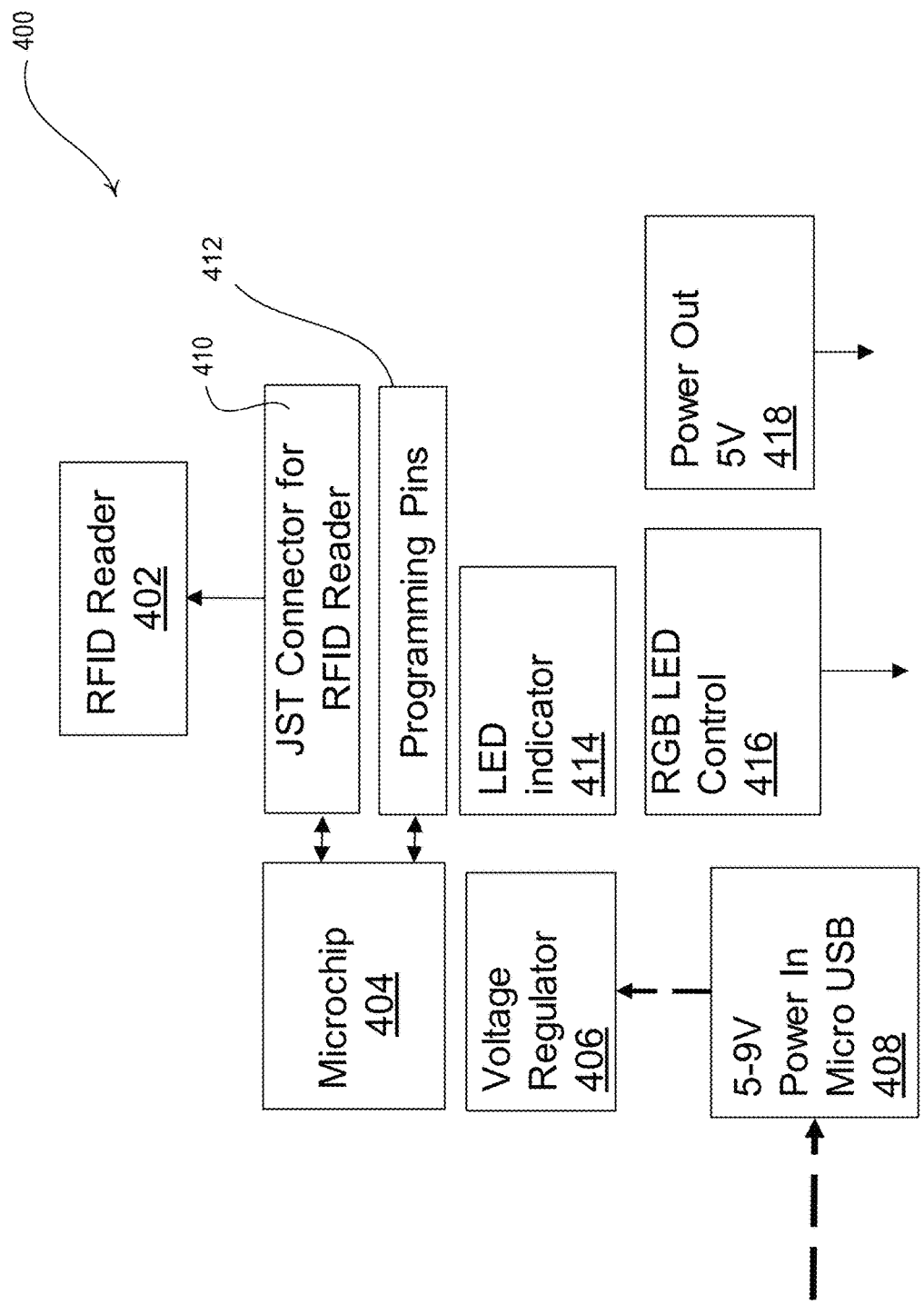
FIG. 4 shows a block diagram of an example a simple controller (SC).

FIG. 4 shows a block diagram of an example a simple controller (SC) 400 (e.g., simple wand controller (SWC)). The SC 400 may be similar to the UC 300 illustrated in FIG. 3. The SC 400 may control an electrical object (e.g., a 5V object). For example, the SC 400 may control a lamp, and a master control device may control the lamp by sending a digital message to the SC 400 via RF communications (e.g., RFID, NFC, BLE, etc.) to turn the lamp on or off. The SC 400 may be powered via a power input 408. The power input 408 may be, for example, a Micro USB or Qi wireless charging source. The power input 408 may receive 5V of power from the power source and may provide the power to a power output 418 (e.g., a 5V power output) for controlling one or more electrical loads (e.g., LEDs).

The power may pass through a voltage regulator 406. The voltage regulator 406 may drop the voltage, for example, from 5V to 3.3V. The regulated voltage may be used to power the microchip 404 and/or the RFID reader 402. The microchip 404 may include a processor and a memory, as described herein. The microchip 404 may be connected to an antenna that may be used to send and receive data (e.g., a firmware update, etc.) via RF communications as described herein. The microchip 404 may allow the SC 400 to communicate with external entities. For example, the microchip 404 may allow the SC 400 to access a database via the antenna. The SC 400 may include an RBG LED control output 416. The RGB LED control output 416 may be powered with 3.3V and may be used to power and/or control one or more LEDs.

The SC 400 may include an RFID reader 402, which may be attached to programming pins 412 of the SC 400 by use of a connector 412. The connector 412 may be a JST Connector as described herein. The RFID reader 402 may read a unique identifier from a master control device (not shown) and may communicate the unique identifier to the processor of the microchip 404 via the programming pins 412. The RFID reader 402 may be replaceable as described herein. The SC 400 may include an LED indicator 414, which may blink or glow to indicate a status of the SC 400 as described herein.

Figure 5A:
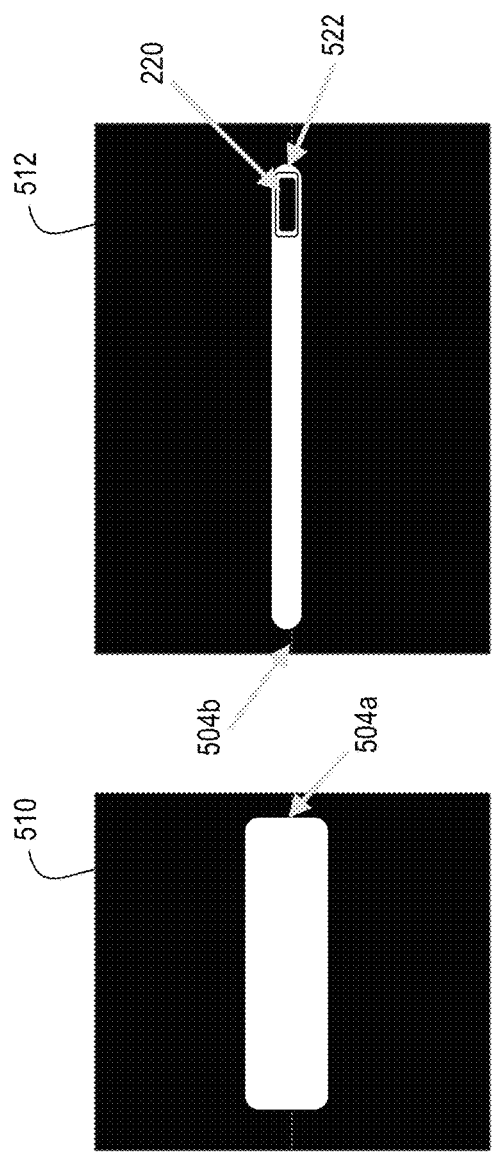
FIG. 5A illustrates a diagram of a cross-sectional side view of an example silicon mold that may be used for manufacturing the master control device.

FIG. 5A illustrates a diagram of a cross-sectional side view of an example silicon mold that may be used for manufacturing the master control device. As shown in FIG. 5A, a recessed mold 510 of the handle of the master control device may be created. A recessed mold 512 of the shaft of the master control device may be created. The recessed mold may be a silicon mold. The control circuit 220 may be placed inside the recessed mold 512 at the end of the shaft portion of the master control device. The silicon mold 510 and the silicon mold 512 may be shaped with the recessed portions conforming to the lengths and diameters of the respective handle and shaft as described herein, such that the master control device may be created by filling the silicon molds 510, 512 with an appropriate liquid material (e.g., resin, plastic, and/or the like) via respective entry points 504a, 504b.

The liquid material may solidify in the silicon molds 510, 512 into the defined shapes. The control circuit 220 may be encapsulated in the shaft of the master control device as the liquid material solidifies. The silicon molds 510, 512 may be reusable. The silicon molds 510, 512 may each be in two or more sections, or may be a single mold. The portions of the master control device may be joined together after the liquid material has solidified.

Figure 5B:
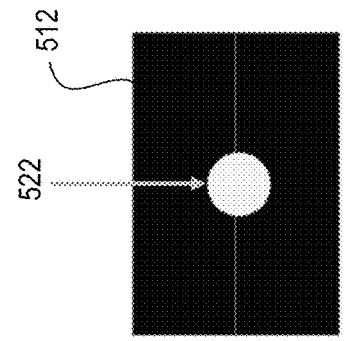
FIG. 5B illustrates a diagram of a cross-sectional front view of the silicon mold that may be used for manufacturing the master control device.

FIG. 5B illustrates a diagram of a cross-sectional front view of the silicon mold 512 that may be used for manufacturing the master control device. The cross-sectional front view of the silicon mold 512 shows that the front tip 522 of the master control device encapsulates the control circuit 220.

Figure 6:
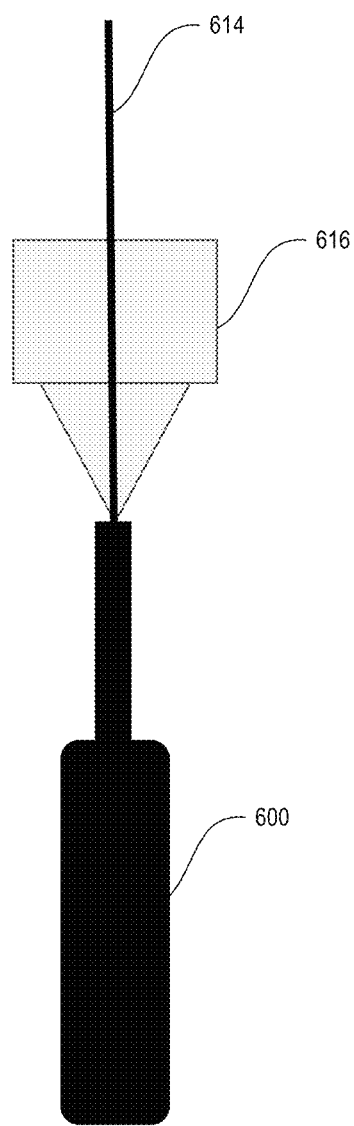
FIG. 6 illustrates a diagram of an example process for manufacturing a master control device using a three-dimensional 3D printing technique.

FIG. 6 illustrates a diagram of an example process for manufacturing a master control device 600 using a three-dimensional 3D printing technique. As shown in FIG. 6, the master control device 600, or portions thereof may be printed (e.g., 3D printed) in the configuration described herein. For example, material 614 may be melted and directed by nozzle 616 into the shape of the master control device 600. The material 616 may be, for example, a plastic, a resin, a wood/PLA composite, or any other suitable material. Nozzle 616 may be controlled by a computer (not shown) that may refer to or access a predetermined design, such as a design having the configurations described herein.

Figure 7A:
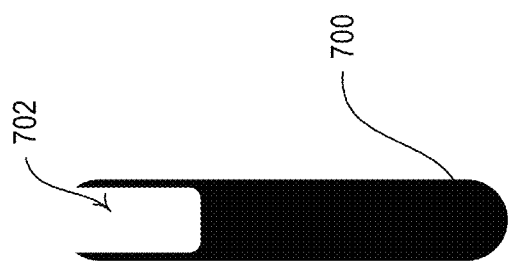
FIG. 7A illustrates a diagram of an example configuration for a distal end of the shaft of the master control device.

FIG. 7A illustrates a diagram of an example configuration for a distal end of the shaft of the master control device 700. The configuration illustrated in FIG. 7A may be performed using any of the manufacturing processes described herein. As illustrated in FIG. 7A, the distal end of the shaft of the master control device 700 may include an opening 702. The opening 702 may be approximately the size of the casing for the control circuit, such that the casing of the control circuit abuts each side wall of the opening 702. For example, the opening 702 may have a height within the range 12 mm to 23 mm and a diameter within the range 2.12 mm to 3.85 mm. The control circuit may be inserted into the opening 702 after the master control device 700 has been manufactured.

Figure 7B:
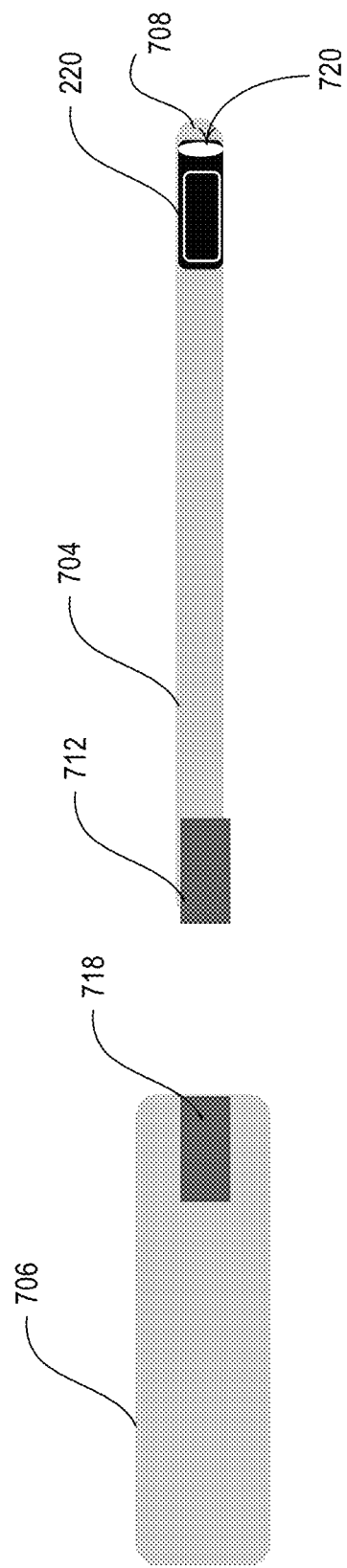
FIG. 7B illustrates a diagram of an example master control device formed in two pieces that are later attached.

As shown in FIG. 7B, the master control device 700 may be formed in one piece or in multiple pieces that are later joined together. For example, handle 706 and shaft 704 may be formed separately. The handle 706 and the shaft 704 may be formed such that one section is able to be fastened to the other section using, for example, a screw, clasps, pins, and/or the like. The control circuit 220 may be positioned such that it is located on the end of the shaft 704 furthest from the handle 706.

The master control device 700 may be manufactured without the control circuit 220, and the control circuit 220 may be inserted into the master control device 700 after manufacturing of the master control device 700. The shaft 704 may have an opening 702 at one end following manufacturing of the master control device 700. The opening 702 may be of a size and shape that allows the control circuit 220 to be securely inserted into opening 702. For example, the opening 702 may have an internal length within the range 12 mm to 23 mm and a diameter within the range 2.12 mm to 3.85 mm. A distal end of the casing of the control circuit 220 may be approximately flush with the top portion of the opening 702, which may leave an exposed portion 720 of the casing of the control circuit 220. The exposed portion 720 of the casing of the control circuit 220 may be capped by filler 708 after the control circuit 220 has been inserted into opening 702. The filler 708 may be, for example, a liquid resin or glue that solidifies after it is applied to the exposed portion of casing 220. The filler 708 may be a cap that is fastened to the end of the shaft of the master control device 700 using, for example, a screw, clasps, pins, and/or the like.

As shown in FIG. 7B, the master control device 700 may be manufactured in two or more separate parts that are later attached to each other. For example, the handle 706 and the shaft 704 may be manufactured separately. The handle 706 and the shaft 704 may be attached using a fastening mechanism, such as a screwing mechanism, a clasping mechanism, pins, and/or the like. For example, the handle 706 may include an attachment point 718 and the shaft 704 may include an attachment point 712. One of the attachment points 718, 712 may be female and the other may be male. Sections of the master control device 700 that are manufactured separately may be manufactured using different techniques. For example, handle 706 may be manufactured using a silicon mold and shaft 704 may be manufactured using 3D printing techniques, or vice versa.

Figure 8A:
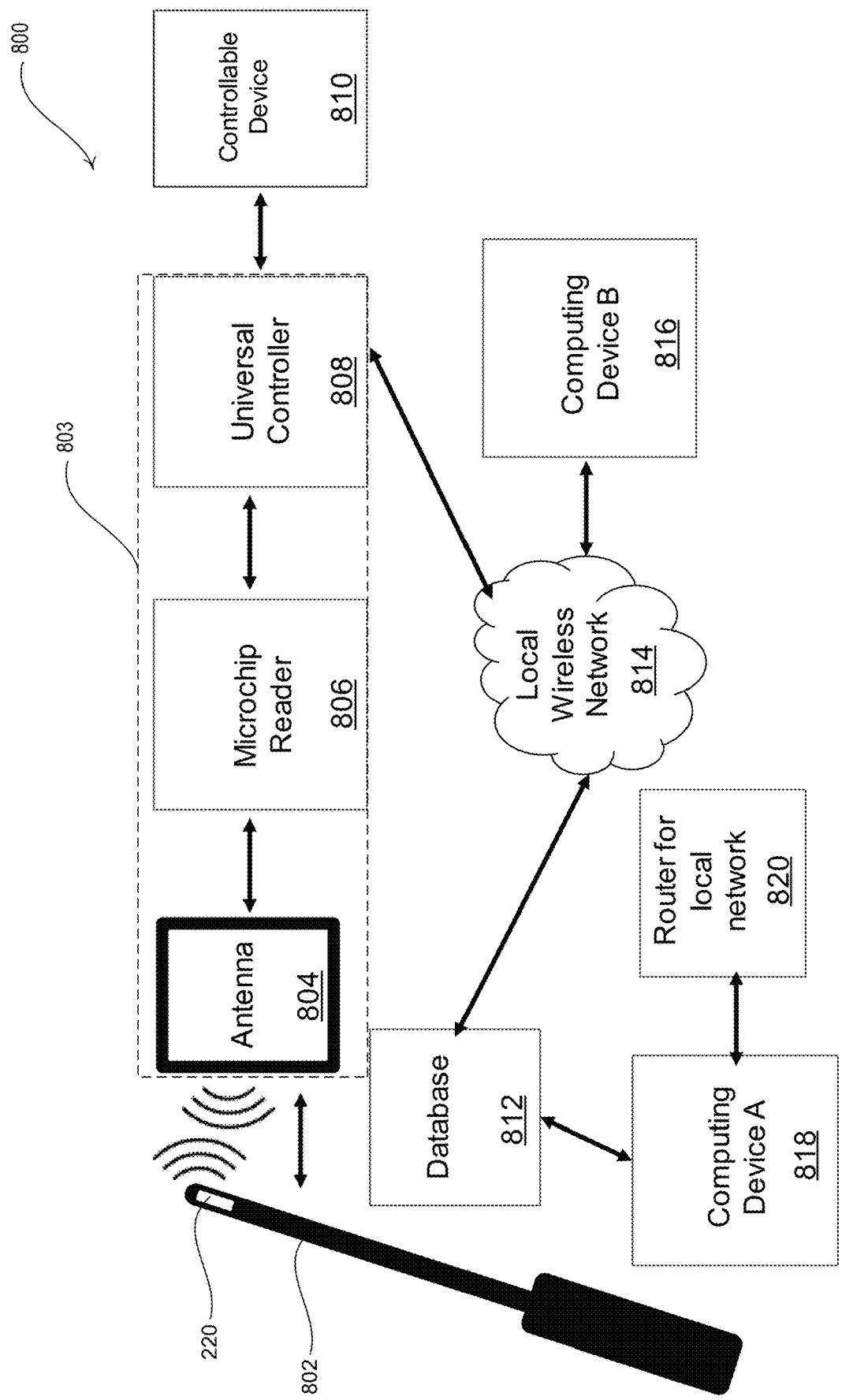
FIG. 8A illustrates a diagram of an example control system in which the master control device may interact with a UR to complete a specific action.

FIG. 8A illustrates a diagram of an example control system 800 in which the master control device 802 may interact with a Universal Receiver (UR) 803 (e.g., a UWR) to complete a specific action. The UR 803 may include or may interact with a UC 808 (e.g., a UWC) and/or an SC (e.g., an SWC). Master control device 802 may include control circuit 220, which may include a transponder (e.g., an RFID or NFC transmitter) with a unique identifier. The master control device 802 may be in the shape of a wand and may be held by a user. The user may tap or bring the end of the master control device 802, including the control circuit 220, within a wireless range of an antenna 804 for a microchip reader 806 (e.g., an RFID/NFC reader) to communicate with the microchip reader 806. The control circuit 220 may transmit the unique identifier to the microchip reader 806. The microchip reader 806 may send a digital message to the control circuit 220 to confirm receipt of the unique identifier via the antenna 804. The control circuit 220 may include an LED, which may blink when the master control device 802 comes into contact with, or within a wireless range of, the antenna 804. The master control device 802 may vibrate, shine, or otherwise indicate to the user that receipt of the unique identifier has been confirmed.

The control circuit 220 and reader 806 may be compatible both in frequency and standard. Tracking tags in the control circuit 220 may be made with the frequency and protocol compatible with the available RFID readers on the market. The tag in the control circuit 220 may operate at 13.56 mhz and may be a Ntag216 NFC and RFID compatible chip or any Ntag NFC and RFID compatible chip that runs at protocol ISO14443A/B. The tag may be, for example, 3.85 mm by 23 mm. The tag may be a high-frequency, passive tag that is compatible with the Mifare RC522, MF-RC522, RFID-RC522, and/or other readers operating at 13.56 mhz and protocol ISO14443A/B. The tag may be compatible with NFC readers of the same frequency and/or protocol.

The control circuit 220 may be readable and writeable, and the microchip reader 806 may be used to both receive data from the control circuit 220 and write data to the control circuit 220.

Upon receipt of the unique identifier, the microchip reader 806 may communicate with the UC 808 (e.g., as described herein). The microchip reader 806 may communicate with the UC 808 via a wired connection. The UC 808 may be connected to or otherwise associated with a controllable device 810. The controllable device 810 may be, for example, a light, a lock, a valve for a liquid, a valve for a gas, a magnetic stirrer, a fire starter/pilot light, a spark plug, and/or any other electronic device capable of performing an action. The UC 808 may be connected to a network 814 via a wireless connection (e.g., WiFi, Bluetooth, cellular, and/or the like). The network 814 may be, for example, a local wireless network.

One or more other devices may be connected to the UC 808 via the network 814. For example, the UC 808 may connect via the network 814 to a database 812 and/or one or more computing devices 816, 818. The database 812 may be running on, for example, a Raspberry Pi. Computing device A 818 may be located at the UR 803 for performing control, or at a remote location. The computing device A 818 may be, for example, a laptop/PC, and may be used for control and/or monitoring.

The UC 808 may access the database 812 via the network 814. The database 812 may store one or more associations between a unique identifier and an action to be performed upon receipt of the unique identifier from the master control device 802. For example, the controllable device 810 may be an electronic lock on a door. The database 812 may store an association between the unique identifier and locking the door (e.g., if the door is unlocked) or unlocking the door (e.g., if the door is locked). The UC 808 may retrieve the action associated with the unique identifier from the database 812 and may send a command to the controllable device 810 to perform the action.

The action that is performed may also be based on the location of the user. The location of the user may be determined from a computing device associated with the user (e.g., computing device B 816, which may be the user's mobile phone), or by the location at which the master control device 802 is being read by the microchip reader 806. For example, if the master control device 802 taps the antenna 804 located near a door and/or the UR 803, or component thereof, has an identifier in the database that is associated with a lock on a door, then the instruction may be sent to lock/unlock the door. If the antenna 804 is located near a light and/or the UR 803, or component thereof, has an identifier in the database that is associated with a light, control instructions may be generated for controlling the light.

The database 812 may include multiple possible actions for a single unique identifier. The UC 808 may determine which action to perform based on, for example, an identity of the controllable device 810, a quality and/or state of the controllable device 810, a time value, a location of the microchip reader 806, a number of taps of the master control device 802 against the microchip reader 806, and/or the like. For example, the controllable device 810 may be and/or may be associated with a valve (not shown) that controls the flow of a liquid (e.g., a drink). The user may hold the master control device 802 against the microchip reader 806 with the valve in the closed position. The UC 808 may receive the unique identifier and may identify from the database 812 that the action to be performed is to open the valve. The UC 808 may send a command to the controllable device 810 to open the valve. The UC 808 may keep the valve open as long as the master control device 802 is held against the microchip reader 806. The user may remove the master control device 802 from the microchip reader 806, and the UC 808 may send a command to the controllable device 810 to close the valve. Alternatively, if the controllable device 810 controls a light, the user may tap the master control device 802 against the microchip reader 806 once to turn on the light, remove the master control device 802 from the microchip reader 806 for a period of time, and tap the master control device 802 against the microchip reader 806 a second time to turn off the light. The database 812 may store more than one association (e.g., command) for the same unique identifier/controllable device pair, and the UC 808 may determine a command to send to the controllable device 810 based on a state of the controllable device 810. For example, the UC 808 may command the controllable device 810 to turn on the light if the light is off and may command the controllable device 810 to turn off the light if the light is on.

The unique identifier received from the master control device 802 may be associated with the name of the user in the database 812. The database 812 may include a Boolean variable for each unique identifier indicating whether the master control device 802 associated with the unique identifier is active. A unique identifier may be marked as active when the master control device 802 is assigned to a user, and marked as inactive when the user returns the master control device 802.

The computing device A 818 may be used to monitor and/or control the reception of the unique identifier, the accessing of the database 812, and the performing of the action. The computing device A 818 may be connected to a router for a local network 820. Computing device A 818 may be the location at which the database 812 is stored, and may be the access point for the local wireless network 814. For example, the computing device A 818 may log the reception of the unique identifier and the performing of the action. The computing device A 818 may log a number of times that the action is performed, an amount of time between performing two actions, and/or a number of distinct unique identifiers received. For example, the controllable device 810 may be and/or may be associated with a valve (not shown) that controls the flow of a liquid (e.g., a solenoid valve controlling the flow of a drink). The user may hold the master control device 802 against the microchip reader 806 to open the valve and remove the master control device 802 from the microchip reader 806 to close the valve.

The computing device A 818 may measure an amount of time that the valve was open, which may be directly proportional to the amount of liquid dispensed. In another example, the controllable device 810 may be a flow meter that may directly measure the amount of liquid poured and communicate that amount (e.g., via the UR 803) to the computing device A 818. The controllable device 810 may include multiple different taps from which different liquids may be dispensed and the amount from each tap may be measured by a flow meter and communicated back to the computing device A 818.

It may be difficult to determine the amount of liquid dispensed from each pressurized tap in a pressurized system. When the controllable device 810 includes a flow meter, the amount of liquid being dispensed from each tap may be calculated and the amount of pressure may be adjusted to optimize the system.

The computing device A 818 may determine an amount of money owed by the user based on the amount of liquid dispensed. The computing device A 818 may communicate information to the database 812, the microchip reader 806, the master control device 802, and/or computing device B 816 via the network 814. As different liquids may have a different cost and/or pressure associated therewith, the computing device A 818 may associate the cost and/or pressure for each liquid dispensed from controllable device 810. The computing device B 816 may obtain information from the database 812, UC 808, and/or computing device A 818 via the network 814, and may display or otherwise use the information.

Figure 8B:
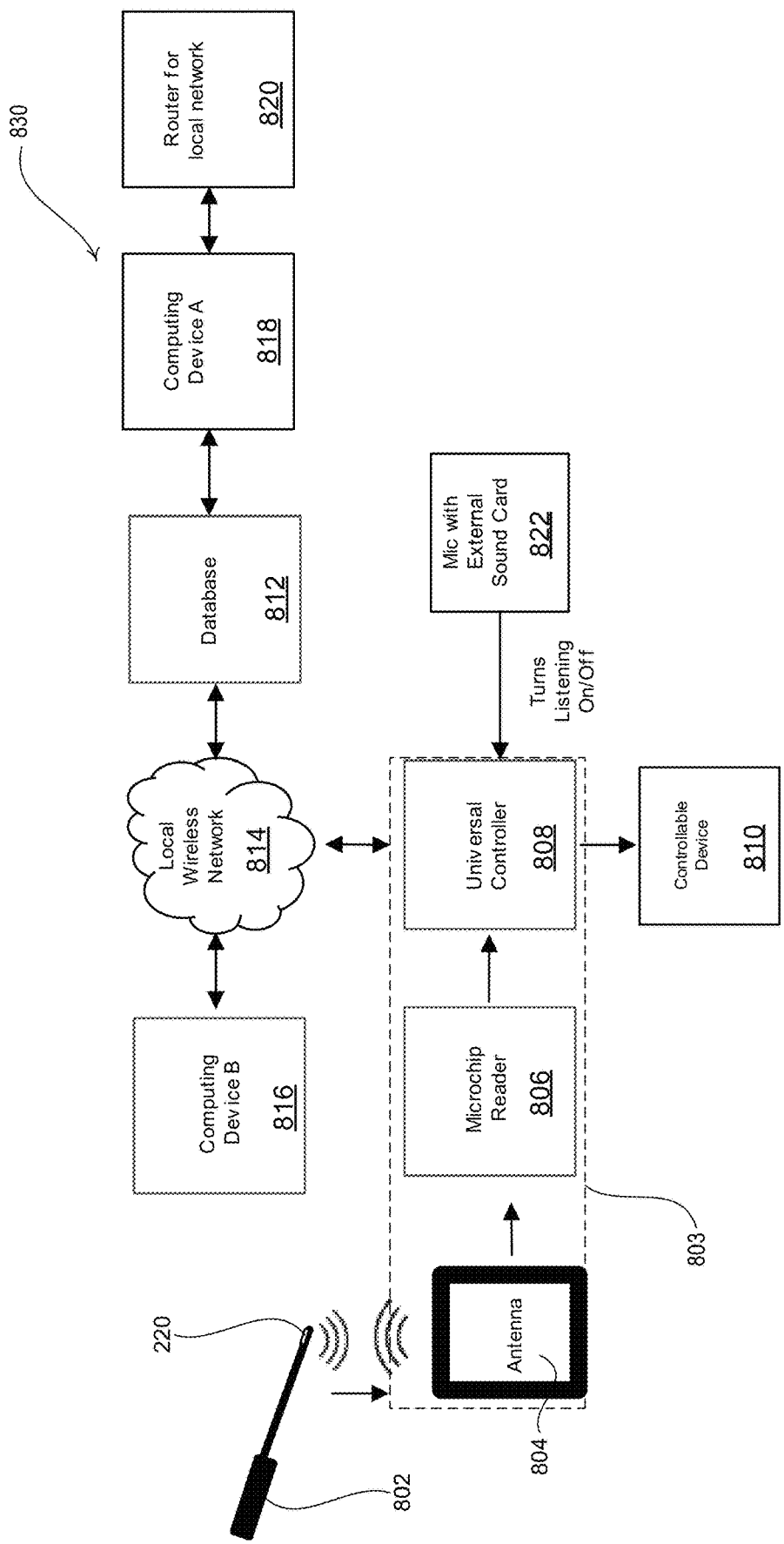
FIG. 8B illustrates a diagram of an example control system in which the system of FIG. 8A may be integrated with a smart device.

FIG. 8B illustrates a diagram of an example control system 830 in which the system 800 may be integrated with a smart device 822 (e.g., a home assistant). For example, the system 830 may be similar to the system 800 shown in FIG. 8A (e.g., with the addition of a smart device). Referring to FIG. 8B, the UC 808 may communicate with the smart device 822 via a wired connection and/or a wireless communication. The smart device 822 may include an integrated microphone, external sound card, and/or an integrated speaker.

The smart device 822 may be equipped with a voice recognition API. The smart device may use the integrated microphone to listen for a specific word or command. There may be a phrase associated with the UC 808 that, when received by the UC 808, causes the UC 808 to send a command to a controllable device 810. The user of the master control device 802 may say the phrase. The smart device 822 may receive the phrase via the microphone and perform voice recognition. If the smart device 822 determines that the user spoke the phrase associated with the UC 808, the smart device 822 may send an indication to the UC 808 that the correct phrase was spoken. Upon receipt of the indication, the UC 808 may send a command to the controllable device 810 to perform an action associated with the phrase.

Figure 9A:
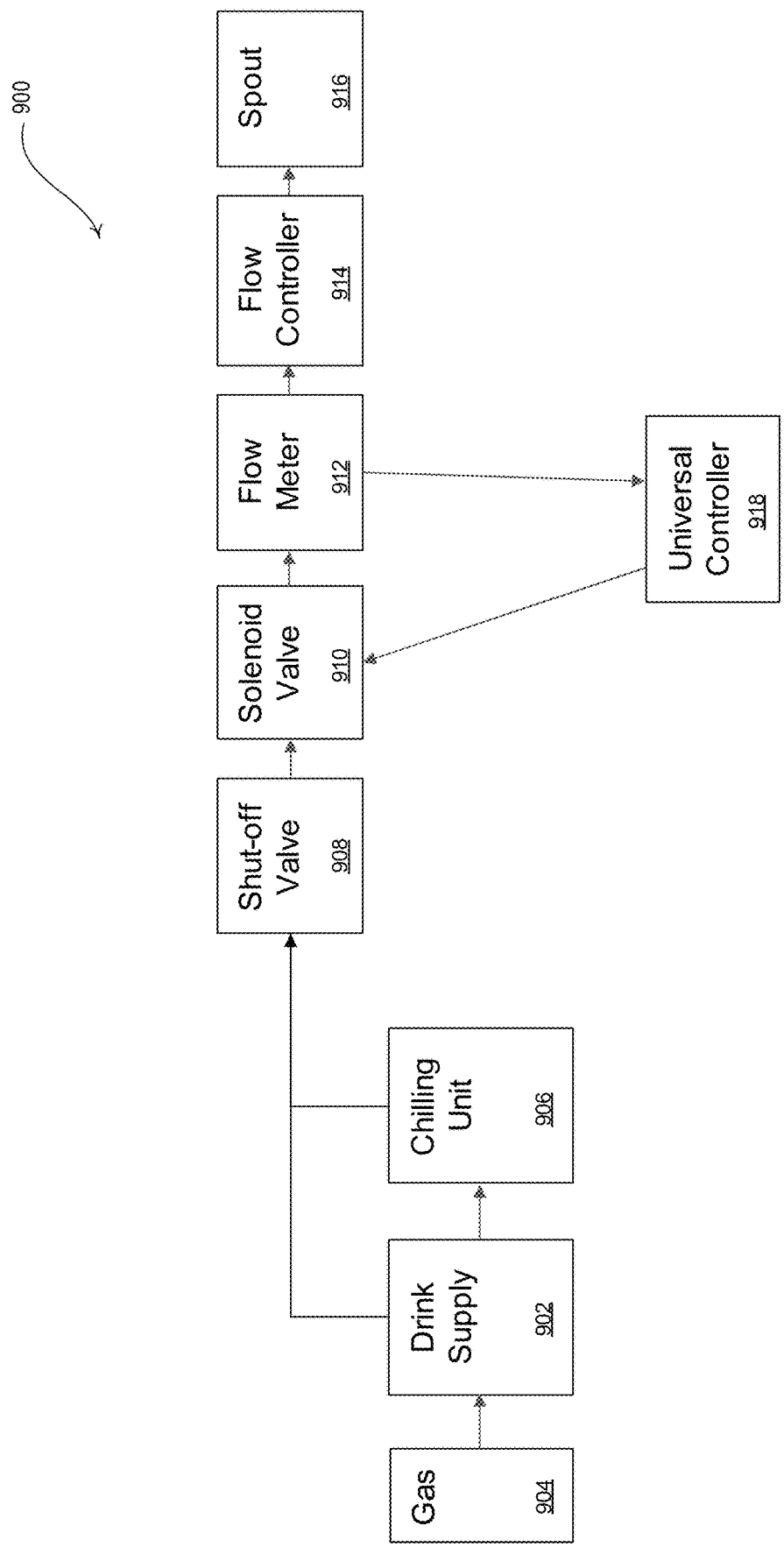
FIG. 9A illustrates a diagram of an example system where the master control device may be used to dispense a drink with gas.

FIG. 9A illustrates a diagram of an example system 900 in which the UC 918 may be used to dispense a drink with gas based on an RF communication from a master control device (not shown). For example, the drink may be beer, and the master control device may be located in a bar or other serving area. The unique identifier received from the master control device may be associated with the name of the user in a database (not shown).

There may be a supply 902 of the drink, which may be connected to a supply of gas 904. For example, the drink may be in a keg, which may be connected via a gas line to a supply of gas 904. The drink supply 902 may be connected to a valve 908 (e.g., a shut-off valve) via a product line. The drink may be provided to the valve 908 via a chilling unit 906, which may be used to decrease the temperature of the drink. The drink may bypass the chilling unit 906.

The shut-off valve 908 may be used to stop the flow of the drink, for example, if an electric circuit or other device fails. The drink may flow from the shut-off valve 908 through a second valve 910 (e.g., a solenoid valve). The solenoid valve 910 may be controlled by a UC 918 (e.g., a UWC). The UC 918 may be connected to one or more other devices (e.g., as shown in FIG. 8A). The UC 918 may receive the unique identifier from the master control device and send a command to perform an action as described herein.

The solenoid valve 910 may be connected to a flow meter 912, which may monitor the flow of the liquid as it is dispensed via a spout 916. For example, the flow meter 912 may monitor the speed of the liquid flow. There may be a flow controller 914 between the solenoid valve 910 and the spout 916. The flow controller 914 may restrict the flow of the liquid. For example, less liquid may pass through the spout 916 if the flow controller 914 is tighter. The solenoid valve 910 may open to dispense the drink and close to stop dispensing the drink, for example upon receiving a command from the UC 918. There may be a flow meter 912 that measures the amount of drink dispensed. The flow meter 912 may measure the amount of drink dispensed directly and/or indirectly. For example, the flow meter 912 may measure a number of rotations of a motor associated with the flow meter 912, and determine the amount of drink dispensed based on the amount of rotations.

The flow meter 912 may send information about the amount of drink dispensed to the UC 918. The UC 918 may send the information to the database, which may store associations between the type or brand of the drink and the amount of drink dispensed. The database may also store, for example, the number of times and the duration that the user used the master control device or information regarding an instance of the use of the master control device. The information about the amount of drink dispensed to the user may be used to determine an amount of money charged to the user for the drink and/or the pressurization of the particular drink being dispensed. The amount of money and/or pressurization information may be stored in the database and associated with the user. The database may store multiple transactions for a single user (e.g., one amount for each time the user dispenses a drink), or multiple amounts may be added together and stored as a single total for the user. Any further amounts charged to the user may be added to the total. The UC 918 may connect to a computing device B (not shown) from which information in the database (e.g., the charges owed by a given user) may be read, displayed, and/or printed.

Figure 9B:
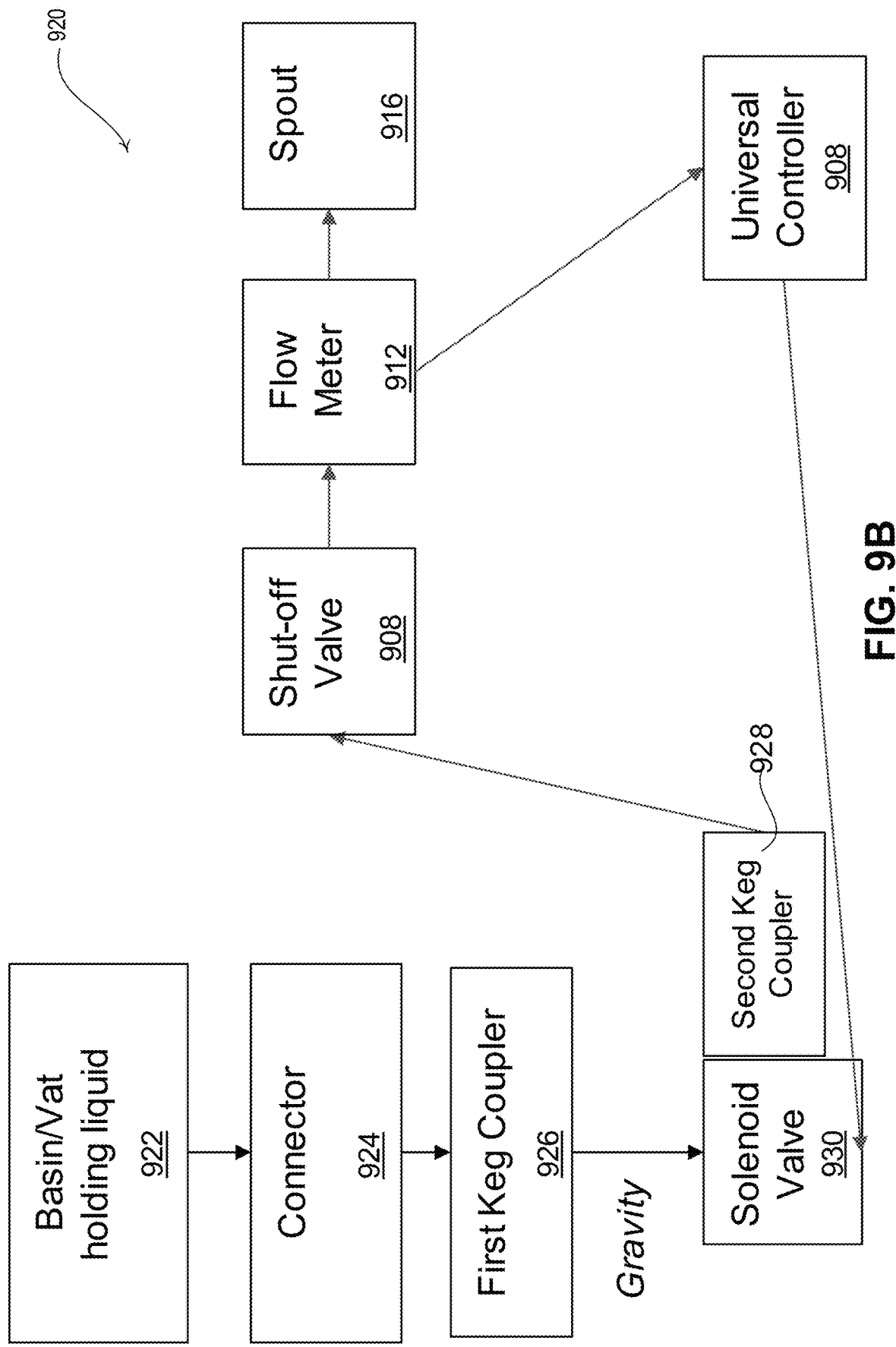
FIG. 9B illustrates a diagram of an example system where the master control device may be used to dispense a drink using gravity.

FIG. 9B illustrates a diagram of an example system 920 in the master control device may be used to dispense a drink using gravity. The example depicted in FIG. 9B may be similar to the example depicted in FIG. 9A. Referring to FIG. 9B, the drink may be held within a basin 922 (e.g., a vat). The basin 922 may be connected via a connector 924 to a first keg coupler 926. The connector 924 may be configured such that it is able to connect the basin 922 to the first keg coupler 926. The first keg coupler 926 may be, for example, a ⅜" John Guest keg coupler. The first keg coupler 926 and the connector 924 may attach the basin 922 to a solenoid valve 930. The solenoid valve 930 may be a "direct acting" solenoid valve. For example, the solenoid valve 930 may use gravity to allow liquid to pass through freely. The solenoid valve 930 may be the same as solenoid valve 910 described in FIG. 9A.

Referring again to FIG. 9B, the basin 922 may be at a higher elevation than the solenoid valve 930, such that when the solenoid valve 930 is opened, the liquid is dispensed via gravity. The solenoid valve 930 may be connected to a second keg coupler 928. The second keg coupler 928 may be connected to a lower end of the solenoid valve 930 (e.g., opposite the first keg coupler 926). The second keg coupler 928 may be connected to the flow meter 912 and the spout 916 via the shut-off valve 908. The flow meter 912, spout 916, and shut-off valve 908 may perform as described in FIG. 9A. The flow meter 912 and solenoid valve 930 may be connected to the UC 908, which may interact with the flow meter 912 and the solenoid valve 930 as described in FIG. 9A.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A master control device for controlling a universal receiver, the master control device comprising:
   a handle comprising a proximal section and a distal section, wherein the handle has a length within a range of 120 mm to 200 mm and a diameter within a range of 20 mm to 100 mm, and wherein the distal section of the handle comprises an opening, the opening being configured to receive a screw thread;

a shaft comprising a proximal section and a distal section, wherein the shaft has a length within a range of 150 mm to 200 mm and a diameter within a range of 8 mm to 15 mm, wherein the proximal section of the shaft comprises the screw thread, and wherein the distal section of the shaft comprises an opening having a length within a range of 12 mm to 23 mm and a diameter within a range of 2.12 mm to 3.85 mm; and a control circuit having a length within a range of 12 mm to 23 mm and a diameter within a range of 2.12 mm to 3.85 mm, the control circuit being configured to be placed within the opening in the proximal section of the shaft, the control circuit comprising:

a radio-frequency identification (RFID) tag associated with a unique identifier;

a near-field communication (NFC) light-emitting diode (LED);

a first coil used to power the RFID tag;

a second coil used to power the NFC LED; and a housing configured to house the RFID tag, the NFC LED, the first coil, and the second coil, wherein the RFID tag is configured to transmit the unique identifier to an RFID reader when the proximal section of the shaft comes within a predefined radio frequency (RF) range of the RFID reader;

wherein the proximal section is configured to attach to the distal section of the handle via the screw thread and the opening in the distal section of the handle such that the master control device has a length within a range of 250 mm to 350 mm.

2. The device of claim 1, wherein the length of the handle is within a range of 140 mm to 180 mm.

3. The device of claim 1, wherein the length of the handle is within a range of 150 mm to 170 mm.

4. The device of claim 1, wherein the diameter of the handle is within a range of 40 mm to 80 mm.

5. The device of claim 1, wherein the diameter of the handle is within a range of 50 mm to 70 mm.

6. The device of claim 1, wherein the length of the shaft is within a range of 160 mm to 190 mm.

7. The device of claim 1, wherein the length of the shaft is within a range of 170 mm to 180 mm.

8. The device of claim 1, wherein the diameter of the shaft is within a range of 9 mm to 14 mm.

9. The device of claim 1, wherein the diameter of the shaft is within a range of 10 mm to 13 mm.

10. The device of claim 1, wherein the length of the master control device is within a range of 270 mm to 330 mm.

11. The device of claim 1, wherein the length of the master control device is within a range of 290 mm to 310 mm.

12. The device of claim 1, wherein the universal receiver is associated with a system for dispensing a drink, and wherein the master control device is configured to control the system for dispensing the drink via the universal receiver.

13. The device of claim 1, wherein the handle and the shaft are configured to be detachable from each other.

14. The device of claim 1, wherein the housing comprises glass.

15. The device of claim 1, wherein the LED is configured to provide feedback to a user of the master control device.

16. The device of claim 1, wherein the length of the opening in the distal section of the shaft is within a range of 14 mm to 21 mm.

17. The device of claim 1, wherein the length of the opening in the distal section of the shaft is within a range of 16 mm to 19 mm.

18. The device of claim 1, wherein the length of the control circuit is within a range of 14 mm to 21 mm.

19. The device of claim 1, wherein the length of the control circuit is within a range of 16 mm to 19 mm.

20. The device of claim 1, wherein the diameter of the opening in the distal section of the shaft is within a range of 2.42 mm to 3.55 mm.

21. The device of claim 1, wherein the diameter of the opening in the distal section of the shaft is within a range of 2.72 mm to 3.25 mm.

22. The device of claim 1, wherein the diameter of the control circuit is within a range of 2.42 mm to 3.55 mm.

23. The device of claim 1, wherein the diameter of the control circuit is within a range of 2.72 mm to 3.25 mm.

24. A system comprising:
a master control device comprising:
a handle comprising a proximal section and a distal section, wherein the handle has a length within a range of 120 mm to 200 mm and a diameter within a range of 20 mm to 100 mm, and wherein the distal section of the handle comprises an opening, the opening being configured to receive a screw thread;

a shaft comprising a proximal section and a distal section, wherein the shaft has a length within a range of 150 mm to 200 mm and a diameter within a range of 8 mm to 15 mm, wherein the proximal section of the shaft comprises the screw thread, and wherein the distal section of the shaft comprises an opening having a length within a range of 12 mm to 23 mm and a diameter within a range of 2.12 mm to 3.85 mm; and a control circuit having a length within a range of 12 mm to 23 mm and a diameter within a range of 2.12 mm to 3.85 mm, the control circuit being configured to be placed within the opening in the proximal section of the shaft, the control circuit comprising:

a radio-frequency identification (RFID) tag associated with a unique identifier;

a near-field communication (NFC) light-emitting diode (LED);

a first coil used to power the RFID tag;

a second coil used to power the NFC LED; and a housing configured to house the RFID tag, the NFC LED, the first coil, and the second coil, wherein the RFID tag is configured to transmit the unique identifier to an RFID reader when the proximal section of the shaft comes within a predefined radio frequency (RF) range of the RFID reader;

wherein the proximal section is configured to attach to the distal section of the handle via the screw thread and the opening in the distal section of the handle such that the master control device has a length within a range of 250 mm to 350 mm;

a universal receiver comprising:
an antenna;
the RFID reader configured to receive the unique identifier from the RFID tag via the antenna when the proximal section of the shaft comes within the predefined RF range of the RFID reader; and a universal controller configured to:
  receive the unique identifier from the RFID reader;
  connect to a database via a network, wherein the database comprises an association between the unique identifier and an action to be performed by a controllable device; and
  send a command to the controllable device to perform the action upon receipt of the unique identifier from the RFID reader; and
the controllable device, wherein the controllable device comprises:
a supply of a liquid;
a solenoid valve configured to control a flow of the liquid;
a flow meter configured to measure an amount of the liquid that flows through the solenoid valve; and
a spout configured to dispense the liquid;
wherein the solenoid valve is configured to change from an open position to a closed position, or from the closed position to the open position, upon receipt of the command from the universal controller to change a position of the valve, and wherein the flow meter is configured to send an indication of the amount of the liquid that flows through the solenoid valve to the universal controller.

* * * * *